United States Patent [19]

Newby, Sr.

[11] Patent Number: 5,207,723
[45] Date of Patent: May 4, 1993

[54] PORTABLE SECTIONAL STORAGE CABINET

[75] Inventor: John P. Newby, Sr., Raleigh, N.C.

[73] Assignee: Southern Case, Inc., Raleigh, N.C.

[21] Appl. No.: 764,797

[22] Filed: Sep. 24, 1991

[51] Int. Cl.⁵ .......................................... A47B 47/04
[52] U.S. Cl. ...................... 312/249.11; 312/257.1; 312/290
[58] Field of Search .................. 312/328, 329, 257.1, 312/250, 290

[56] References Cited

U.S. PATENT DOCUMENTS

| D. 311,622 | 10/1990 | Swig | D34/25 |
|---|---|---|---|
| 886,530 | 6/1907 | Mestemacher . | |
| 1,664,431 | 4/1928 | Ringer . | |
| 2,124,071 | 7/1938 | Loftin | 206/10 |
| 2,265,618 | 12/1941 | Adams | 220/4 |
| 2,300,405 | 11/1942 | Cook | 312/329 |
| 2,525,208 | 10/1950 | Clink | 312/107 |
| 2,572,486 | 10/1951 | Isaac | 312/250 X |
| 2,893,749 | 7/1959 | Simonsen | 280/47.19 |
| 2,905,480 | 9/1959 | Giovannelli | 280/34 |
| 3,010,775 | 11/1961 | Giovannelli | 312/250 X |
| 3,118,685 | 1/1964 | Jordan | 280/47.19 |
| 3,779,623 | 12/1973 | Motohashi | 312/257.1 |
| 3,831,799 | 8/1974 | Nutt | 220/4 F |
| 3,831,805 | 8/1974 | Yonce | 220/94 A |
| 3,984,023 | 10/1976 | Hodas | 220/4 F |
| 4,225,202 | 9/1980 | Chandler | 312/184 |
| 4,350,257 | 9/1982 | Groth et al. | 220/4 |
| 4,387,940 | 6/1983 | Chandler | 312/184 |
| 4,531,645 | 7/1985 | Tisbo et al. | 211/131 |
| 4,662,515 | 5/1987 | Newby, Sr. | 206/349 |

OTHER PUBLICATIONS

Undated Tool Kaddie ™ Brochures (2).

*Primary Examiner*—Peter R. Brown
*Attorney, Agent, or Firm*—Bell, Seltzer, Park & Gibson

[57] ABSTRACT

The cabinet has a plurality of discrete sections that are formed of molded plastic material and that have mating male and female connectors thereon by which the sections can be easily and quickly joined together by unskilled persons having few if any tools. Sections of the cabinet include an upper section that is pivotally movable between forward and rearward positions relative to a rear section of the cabinet, and further include door sections that are pivotally movable relative to opposite side sections of the cabinet and to the bottom section. An elongate shaft, which may be and illustratively is part of a wheel assembly, extends through the opposite side and rear sections and secures the cabinet sections in place. Compartments and sliding drawers within the cabinet are adapted to receive articles of differing types. Movement is imparted to the cabinet by a handle secured to its rear section. Rails upon the rear section permit sliding movement of the cabinet up and down stairways.

18 Claims, 4 Drawing Sheets

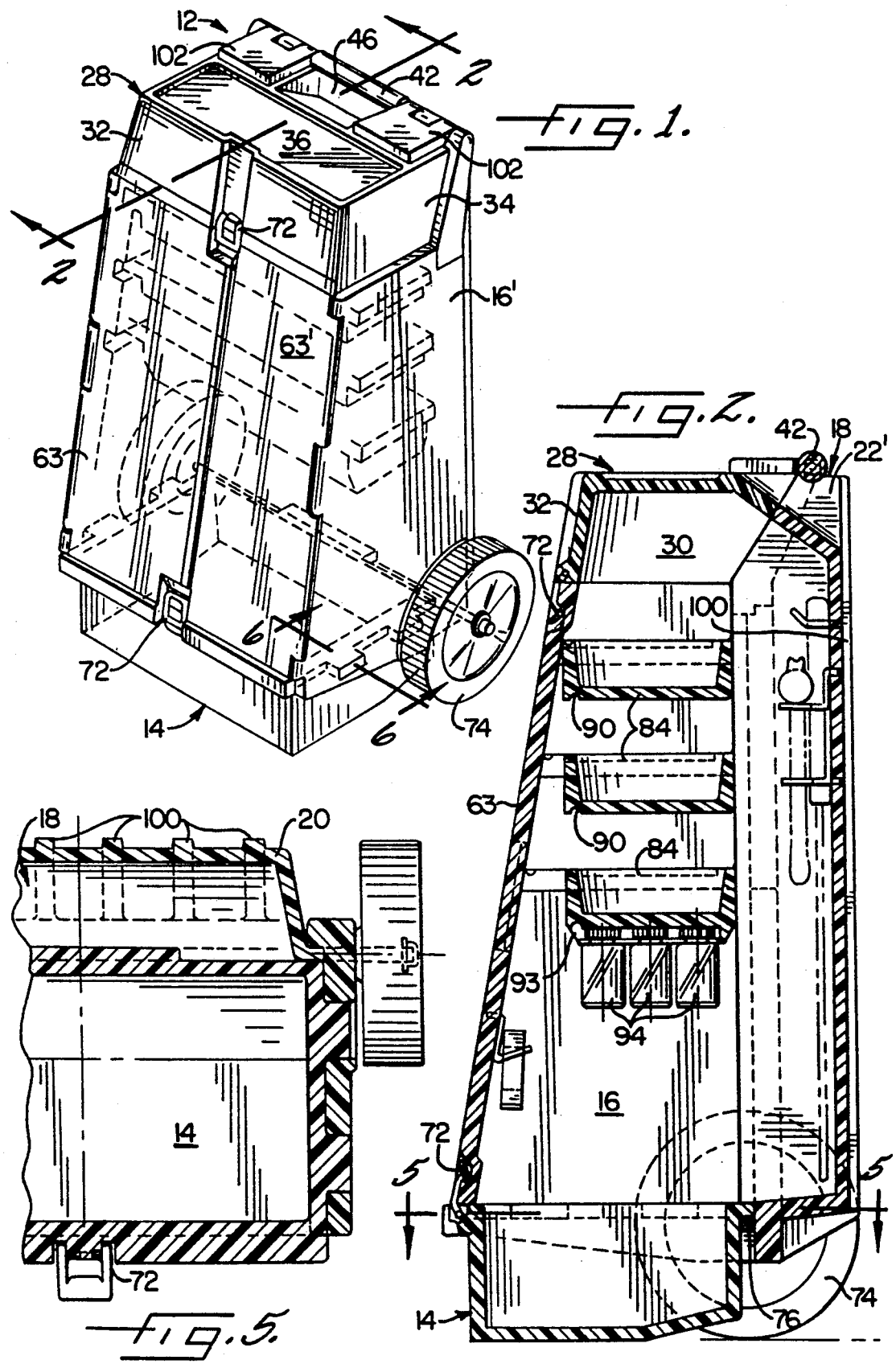

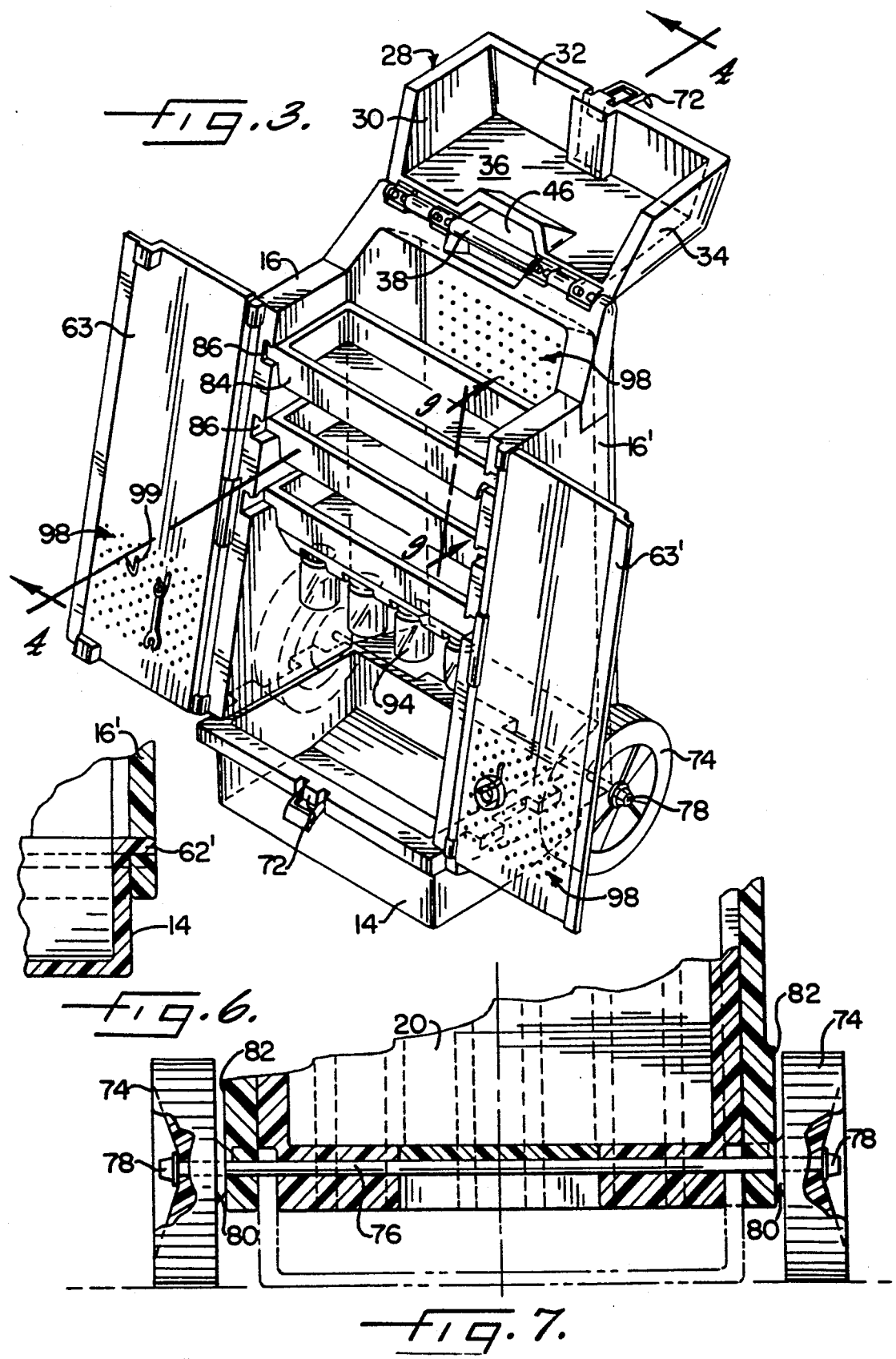

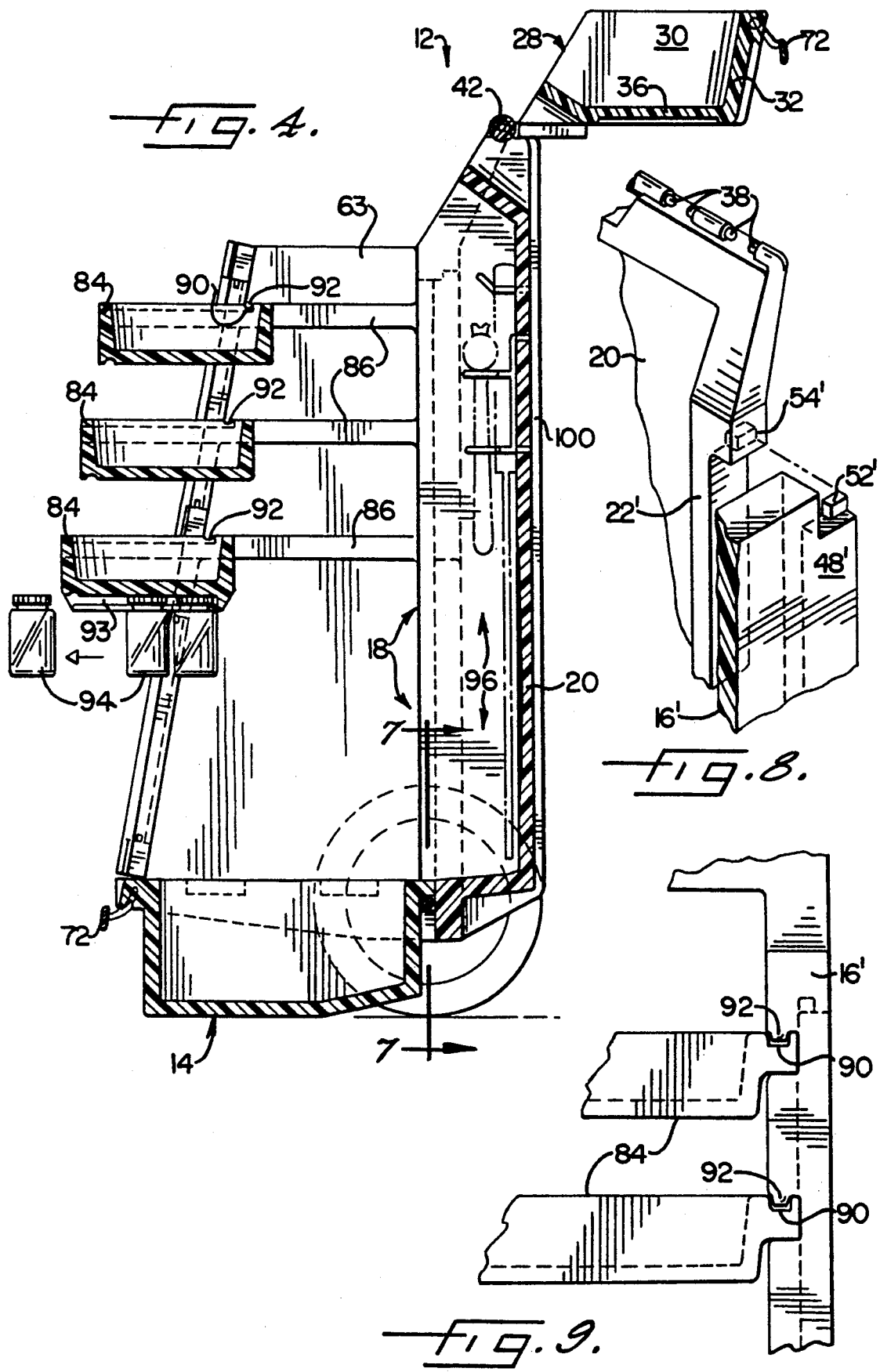

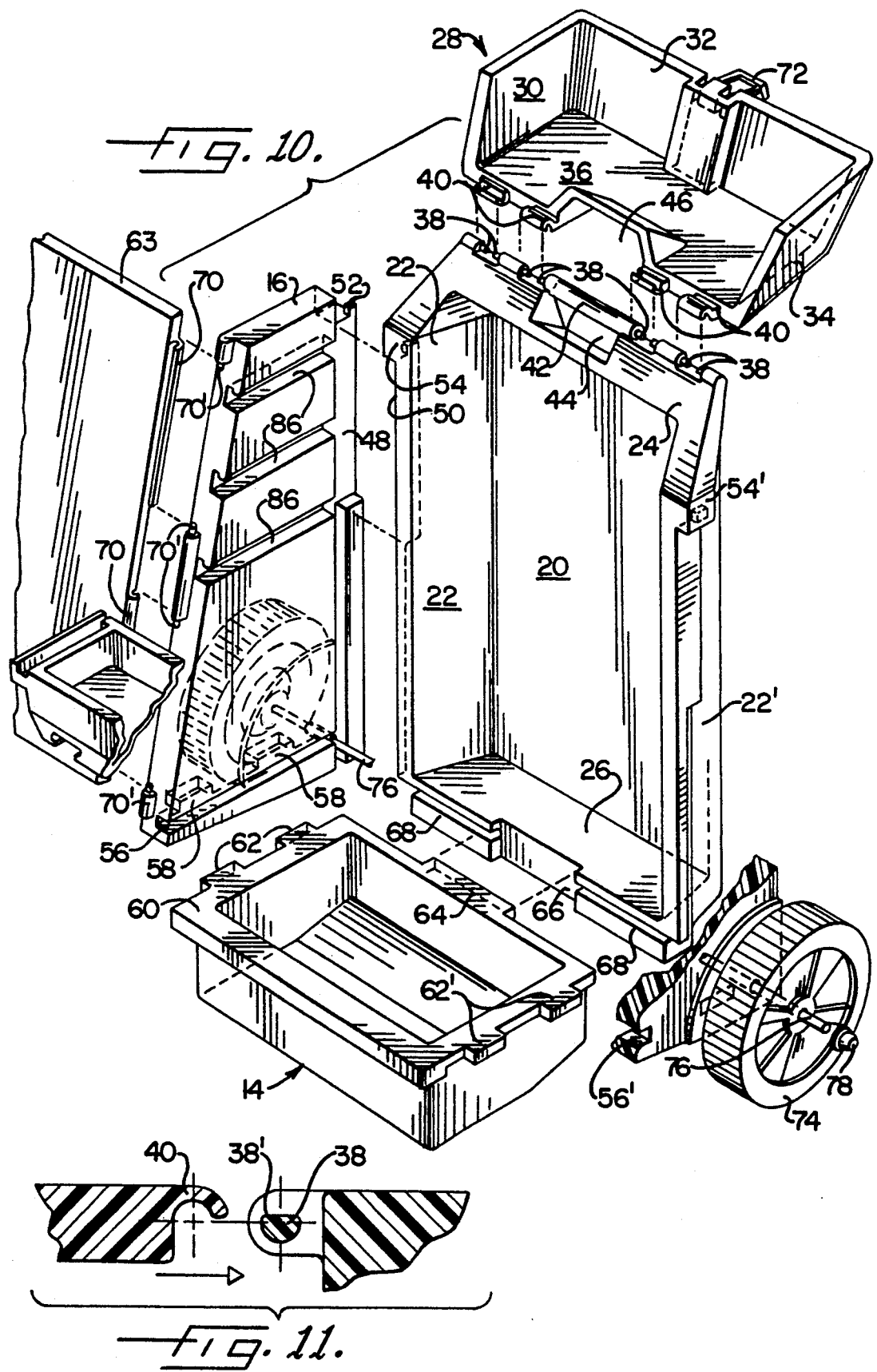

PORTABLE SECTIONAL STORAGE CABINET

This invention relates to portable storage cabinets for tools and/or other articles. The invention more specifically relates to a portable storage cabinet that is formed in discrete mating sections that are capable of being rapidly, easily and properly assembled together by unskilled persons having no tools.

BACKGROUND OF THE INVENTION

Storage cabinets and other furniture items are now frequently manufactured, shipped and sold in sectional form, for subsequent assembly by the purchaser. This significantly reduces the manufacturer's assembly and shipping costs, which permits the manufacturer to sell the furniture for a lesser price. This benefit is frequently offset, however, by the frustration experienced by purchasers, many of whom are unskilled and lack proper tools, as they attempt to assemble the furniture with the often numerous bolts, nuts, washers, screws, brackets, caps, adhesives and/or other fasteners supplied by the manufacturer. There is also substantial likelihood of the furniture piece being improperly assembled due to, for example, threaded fasteners intended for one location being instead used in another location, and/or by reason of their being undertightened or "stripped" by overtightening. When this occurs, the furniture item may lack the stability, rigidity, appearance and/or performance that it would have had if properly assembled. This causes additional purchaser dissatisfaction.

DESCRIPTION OF THE PRIOR ART

The following U.S. patents may be of interest relative to the present invention: 4,662,515, 4,531,645, 4,387,940, 4,350,257, 4,225,202, 3,984,023, 3,831,805, 3,831,799, 3,118,685, 2,905,480, 2,893,749, 2,525,208, 2,265,618, 2,124,071, 1,664,431 and 886,530.

SUMMARY OF THE INVENTION

The present invention provides a portable sectional cabinet, for storing and transporting tools and/or other articles, that is capable of being quickly, easily and properly assembled by unskilled persons having no tools, and which when assembled is quite stable, sturdy and durable. In a preferred embodiment the cabinet includes discrete upper, bottom, rear and opposite side sections having integral connector means, of tongue-and-groove or similar mating types, for joining the aforesaid sections together. The cabinet further preferably includes a pair of front door sections that are pivotally connectible to respective ones of the opposite side sections by mating elements integral with adjacent edge portions of such sections. Final securement of the cabinet sections in assembled relationship is effected by a shaft extending transversely through the lower rear part of the cabinet. In the preferred embodiment, the shaft is the axle of a wheel assembly that supports the cabinet for rolling movement between different locations. A handle is provided upon the upper part of the rear section to facilitate rolling, sliding and other movement of the cabinet.

The upper section of the cabinet is pivotally secured by mating male and female connectors to the cabinet's rear section. The upper cabinet section in a forward pivotal position overlies upper edges of the side and door sections, and serves as a top closure for the cabinet. In such position, the then upper wall of the top section may be used to support and/or align a work piece. In another pivotal position the upper section extends rearwardly and is usable as an article receptacle to supplement drawer and compartment type storage areas within the cabinet. Rails integral with and extending longitudinally of the rear section of the cabinet preferably are provided so as to permit the cabinet to be easily slid up and/or down stairways.

DESCRIPTION OF THE DRAWINGS

Other features of the invention will be apparent from the following description of an illustrative embodiment thereof, which should be read in conjunction with the accompanying drawing, in which:

FIG. 1 is a front right top perspective view of a cabinet in accordance with the invention;

FIG. 2 is an enlarged vertical section taken substantially along the lines and in the direction of the arrows 2—2 of FIG. 1, with some illustrative articles within the shown in side elevation;

FIG. 3 (sheet 2) is a view similar to FIG. 1, but with the door sections of the cabinet being shown in their open positions, and with the upper section of the cabinet being shown in a rearward pivotal position;

FIG. 4 (sheet 3) is a sectional view taken substantially along the lines and in the direction of the arrows 4—4 through the cabinet of FIG. 3 showing storage drawers in their forward positions, and also showing storage jars with one of the drawers;

FIG. 5 (sheet 1) is a sectional view taken generally along lines and in the direction of the arrows 5—5 of FIG. 2;

FIG. 6 (sheet 2) is a fragmentary sectional view taken approximately along the line and in the direction of the arrow 6—6 of FIG. 1;

FIG. 7 is a view primarily in section but with some components shown in elevation, or a wheel assembly that supports the cabinet for rolling movement and interconnects adjacent sections of the cabinet;

FIG. 8 (sheet 3) is a fragmentary perspective view showing mating elements that interconnect upper, rear and side sections of the cabinet;

FIG. 9 (sheet 3) is a fragmentary elevational view, looking in the direction of the arrows 9—9 of FIG. 3, of drawer ends and associated components of the cabinet;

FIG. 10 is an exploded partially fragmentary front right perspective view of sections and wheel assembly components of the cabinet; and FIG. 11 is a fragmentary sectional view of elements that interconnect sections of the cabinet for relative pivotal movement.

DESCRIPTION OF THE PREFERRED EMBODIMENT

The cabinet identified in its entirety in the drawings by the numeral 12 includes a plurality of discrete sections that illustratively and preferably are formed from durable plastic material, preferably blow-molded polyethylene, and that have integral mating male/female or similar connector means by which they may be easily, quickly and properly interconnected. At least some of the sections are of partially hollow double-wall construction. The cabinet sections include a generally horizontally extending, trough-like lower section 14; upstanding opposite side sections 16, 16' that decrease in their forward/rearward dimension from their lower to their upper edges; an upstanding rear section 18 having a rear wall 20 opposite side walls 22, 22', and top and bottom walls 24, 26, respectively; and an upper section 28 that is a pivotally movable between "closed" and "open" positions, respectively shown in FIGS. 1 and 3, and that has generally vertically extending walls 30, 32, 34 and a generally horizontally extending wall 36.

As is best shown in FIGS. 8, 10 and 11, a plurality of axially spaced hinge pin elements 38 are formed integrally with and extend parallel to an upper edge portion of rear section 18. Elements 38 each have a flat area 38', the flat areas on adjacent ones of the elements 38 being upon opposite sides thereof. A plurality of channel-shaped elements 40 are formed integrally with, and at longitudinally spaced intervals along the length of, an adjacent edge of wall 36 of top section 28. Adjacent ones of elements 40 have their opening extending in opposite directions. Pivotal connection of upper section 28 to the upper edge of rear section 18 is quickly and easily effected by aligning the elements 38, 40 thereon, as shown in FIG. 7, and then moving them into mating engagement.

The centrally disposed pair of pins 38 upon the upper edge of section 18 are located upon opposite ends of an elongate handle that is integral with and located centrally of the length of the aforesaid upper edge portion of section 18. Openings 44, 46 within rear section 18 and top section 28 permit handle 42 to be readily grasped by a person desiring to impart movement to cabinet 12.

Side section 16 and rear section 18 are connected to each other by mating male/female connectors that illustratively include a tongue element 48 that projects rearwardly from and extends longitudinally of the rear edge of section 16, and that is received within a mating groove 50 of side wall 22 of rear section 18. Additionally, a generally rectangularly shaped lug 52 projecting upwardly from the upper end of tongue 48 is received within a recess (not shown) of complementary shape opening from the undersurface of a shoulder 54 of rear section 18. As is indicated in FIG. 8, the opposite side section 16' is similarly secured to the opposite side wall 22' of rear section 30 by identical connector elements 50', 52', etc.

Adjacent its lower edge side section 16 has a forwardly/rearwardly extending groove 56 and therewith communicating laterally extending recesses 58. A flange 60 and projecting lugs 62 upon the adjacent side wall of lower section 14 project into groove 56 and recesses 58, respectively, and prevent relative vertical and forward/rearward movement between sections 14 and 16. Identical mating male/female connectors 62', 56', etc., upon the opposite side of cabinet 12 similarly interconnect sections 14, 16'.

A flange 64 located midway of the length of the rear upstanding wall of cabinet section 14 is received within the upper part of a recess 66 within bottom wall 26 of rear section 18, at an elevation above that of a groove 68 that extends longitudinally of and opens from the forward edge of wall 26.

Front door sections 63, 63' are respectively pivotally connected to the forward edges of side sections 16, 16' by mating channel and pin connectors 70, 70' of the same type as shown in FIG. 11. In their closed positions, the free edges of door sections 63, 63' overlap, and may be latched in place by latch members 72 releasably connected to such sections.

In the preferred illustrated embodiment, cabinet 12 is supported for rolling movement over the underlying terrain by a pair of blow-molded plastic wheels 74 that are secured by end caps 78 upon opposite end portions of elongate shaft or axle 76. Axle 76 extends in the width direction of cabinet 12 through aligned bores within the lower rear portions of cabinet side sections 16, 16', and underlies flange 64 of bottom section 12. The inner surface of the hub of each Wheel 74 has a projecting portion 80 that engages a smooth bearing-like surface 82 (FIG. 7) upon the adjacent side section of cabinet 12, and spaces the main body of the wheel from the adjacent side section 16 or 16'. The wheel/axle assembly, when fixed in place by the end caps 78, secures the bottom, side and back sections of cabinet 12 together and, in conjunction with the previously described mating male and female connectors, eliminates the need for bolts, screws or similar conventional fasteners in the assembly of the cabinet.

A plurality of drawers 84 within the upper portion of the interior of cabinet 12 are mounted at their opposite sides within slots 86 of side sections 16, 16' for forward/rearward movement between retracted and extended positions, respectively shown in FIGS. 3 and 4. Each drawer 84 has a groove 88 adjacent its forward edge, which groove assists movement of the drawer forwardly. Each drawer also has a notch 90 adjacent its rearward portion, which notch engages a keeper element 92 adjacent the front of the associated slot 86 when the drawer is moved forwardly, and which prevents the drawer from being inadvertently withdrawn entirely from its associated guide slots 86, permitting easy removal of the drawer when desired. At least the lowermost drawer 84 also has a plurality of forwardly/rearwardly extending slots 93 within its undersurface, which slots receive the upper end portions of jars 94 used to store small articles such as screws, nuts, etc.

A rear storage compartment 96 provided between drawers 84 and rear wall 20 of rear section 18 extends along most of the height dimension of cabinet 12 and is adapted to receive long tools or other articles. Indentations 98 may be and preferably are provided in the interior surfaces of at least door sections 63, 63' and rear section 18 to identify locations where holes may be drilled, if desired, to receive pegboard hooks 99. The double-wall construction of the aforesaid cabinet sections facilitates the installation of such hooks.

A plurality of elongate rails 100 are formed integrally with and extend longitudinally of the full length (vertical dimension) of the rear surface of wall 20 of rear section 18 of the cabinet. Rails 100 facilitate sliding movement of cabinet 12 up and down stairways and the like, and also assist in providing a very strong connection between handle 42 and the lower part of cabinet 12.

As previously noted, when upper cabinet section 28 occupies its rearward pivotal position of FIG. 3, it forms a three-sided compartment for receiving loose tools, fasteners, or other articles. When top section 36 occupies its forwardly pivoted position shown in FIG. 1, it forms a top closure for the cabinet. Additionally, its wall 36 may then be used as a work table or the like. Pads 102 of upper section 32 may conveniently be used to align or "square" a work piece upon wall 36.

In its disassembled condition, cabinet 12 can be shipped in a relatively small carton, which reduces shipping costs. The cabinet can be quickly and easily assembled by a purchaser having few if any mechanical skills or tools. The only "fastener" elements required are the two end caps 78, or equivalent elements (e.g., cotter pins) for preventing outward movement of wheels 74 along axle or shaft 76, and such caps may be secured upon the shaft ends striking them with a shoe, if a hammer is not available.

If rolling movement of cabinet 12 is not desired, wheels 74 could be eliminated entirely. Cabinet 12 could then be supported by its bottom section 12 or, alternatively, could be suspended by its handle 42 from a bracket upon a wall or the like.

While a specific embodiment of the invention has been shown and described, this was for purposes of illustration only and not for purposes of limitation, the scope of the invention being in accordance with the following claims.

I claim:

1. A portable sectional cabinet capable of easy assembly, comprising:
    a lower section;
    a rear section extending upwardly from a rearward part of said lower section;
    first and second opposite side sections extending upwardly from respective first and second opposite side edge portions of said lower section, and forwardly from respective first and second opposite side edge portions of said rear section;
    said lower, rear and side sections being formed of double-wall plastic material;
    mating tongue/groove connector means integral with each of said sections for releasably connecting said rear section to said side sections and said lower section in a manner permitting movement of said rear section in a first direction extending generally vertical relative to said side sections and said lower section while restricting relative movement therebetween in a second vertical direction extending opposite to said first vertical direction; and
    a wheel/axle assembly extending transversely through the lower portion of said cabinet and cooperating with lower portions of said rear section and opposing side sections, and preventing relative movement of said rear section relative to said side sections and said lower section in said first vertical direction.

2. A cabinet as in claim 1, and further including at least one door section.

3. A cabinet as in claim 2, and further including mating male/female connector means integral with a forward edge portion of one of said side sections and with a thereto adjacent edge of said door section and mounting said door section for pivotal movement between an open and closed position.

4. A cabinet as in claim 3, and further including a second front door section and mating male/female connector means integral with a forward edge portion of the other of said side sections and with a thereto adjacent edge portion of said other door section, said connector means mounting said other of said door sections for pivotal movement between open and closed positions.

5. A cabinet as in claim 4, and further including a handle member fixedly connected to and extending in substantially parallel relationship to an upper edge portion of said rear section.

6. A cabinet as in claim 5, and further including an upper section connected to said upper edge portion of said rear section for pivotal movement between a forward position wherein said upper section overlies upper edges of said side sections, and a rearward position wherein said upper section extends rearwardly from said rear section.

7. A cabinet as in claim 6, wherein said handle is integral with said rear section, and further including openings in said rear and upper section permitting easy access to said handle.

8. A cabinet as in claim 7, wherein said upper section when in said forward position thereof has an upper surface adapted to support a work piece and having raised alignment pads thereon adapted to be engaged by said work piece.

9. A cabinet as in claim 8, wherein said upper section when in said rearward position thereof has a wall that extends generally horizontally and has other walls that extend upwardly from side and rear edges of said first-mentioned wall for retaining articles placed upon said first wall.

10. A cabinet as in claim 1, and further including at least one rail projecting rearwardly from and extending longitudinally of said rear section for facilitating sliding movement of said cabinet up and down stairways.

11. A cabinet as in claim 10, wherein said rail is integral with said rear section.

12. A cabinet as in claim 10, and further including a plurality of Vertically spaced drawer supports upon the inner surface of each of said side sections, a plurality of drawers extending between said opposite side sections and mounted by said supports for sliding movement between forward and rearward positions.

13. A cabinet as in claim 12, and further including means upon said drawer support for preventing inadvertent complete withdrawal of said drawers from said supports.

14. A cabinet as in claim 13, wherein at least one of said drawers has a bottom wall, and a groove within and opening from the undersurface of said bottom wall, said groove facilitating forward movement of said drawer by a user of said cabinet.

15. A cabinet as in claim 14, wherein said drawers each have a bottom wall, and wherein at least one of said drawers has a forwardly/rearwardly extending groove of generally T-shaped cross-sectional configuration within and opening from said bottom wall, and further including a plurality of jar-like receptacles having upper ends supportively received within and by said groove for sliding movement longitudinally thereof, said groove having an open forward end and said receptacles being insertable into and removable from said groove via said open forward end thereof.

16. A cabinet as in claim 15, wherein said drawers when in said rearward position thereof are spaced forwardly from said rear cabinet section, and further including a storage area rearwardly of drawers and extending throughout substantially the entire height and width of said rear section of said cabinet.

17. A cabinet as in claim 16, wherein at least one of said sections has an interior surface containing indentations identifying locations where holes may be drilled for reception of article-supporting hook elements.

18. A cabinet as in claim 17, wherein said lower section includes a bottom wall and front, rear and opposite side walls extending upwardly from said bottom wall, and said bottom wall at times at least partially supports said cabinet in a generally upright position.

* * * * *